Aug. 23, 1949.　　　　I. L. LANGVAND　　　　2,479,578
TUBULAR STRUCTURE
Filed Sept. 25, 1943　　　　2 Sheets-Sheet 1
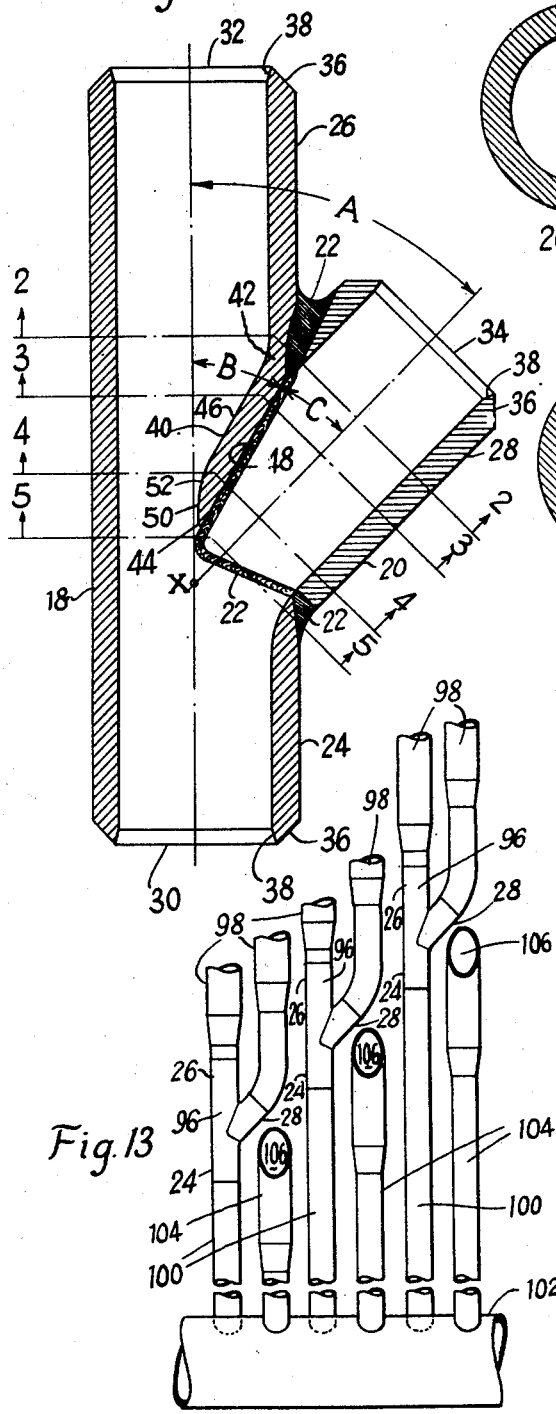
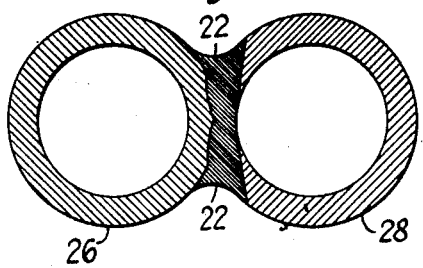
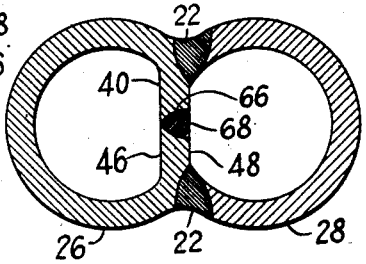
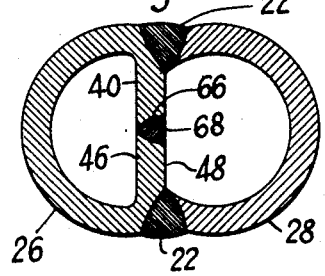
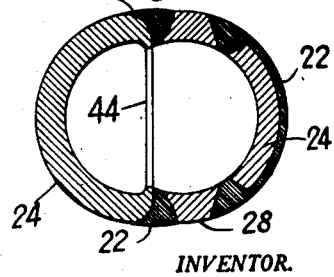
INVENTOR.
BY Ivar L. Langvand
ATTORNEY

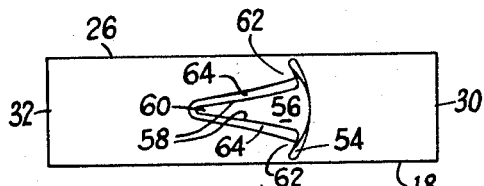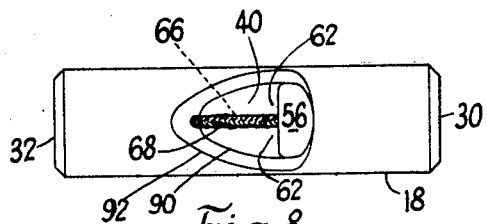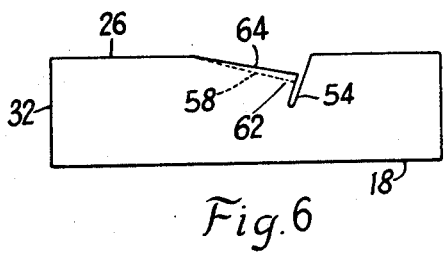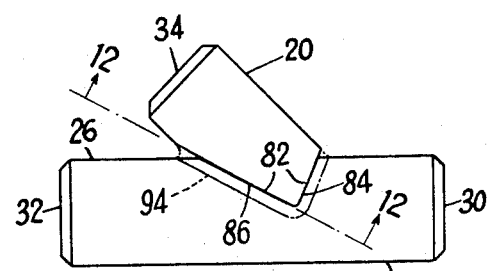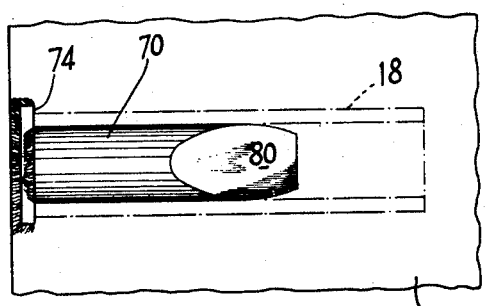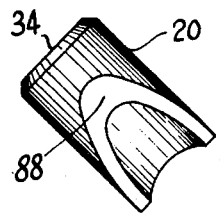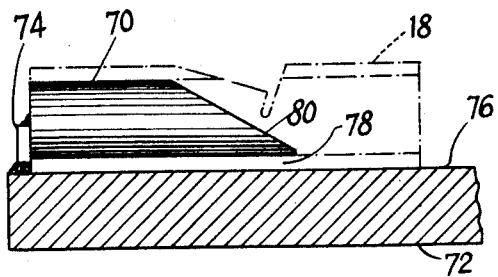

Patented Aug. 23, 1949

2,479,578

UNITED STATES PATENT OFFICE 2,479,578

TUBULAR STRUCTURE

Ivar L. Langvand, Barberton, Ohio, assignor to The Babcock & Wilcox Company, Rockleigh, N. J., a corporation of New Jersey Application September 25, 1943, Serial No. 503,765

8 Claims. (Cl. 285—210)

The invention herein disclosed relates to a tubular structure of a type commonly known as a branch fitting whereby a single stream of fluid may be divided into a plurality of streams, or a plurality of streams combined into a single stream.

While such fittings as a class are generally well-known, it is a purpose of the present invention to provide a branch fitting especially adapted to withstand high internal fluid pressures, and to accommodate a maximum flow of fluid through any or all of its several branches with minimum loss in velocity head.

It is also an object particularly when dividing a single stream for flow through a plurality of branches to provide substantially equal distribution of fluid between the outlet branches.

Another object is to provide a branch fitting affording substantially equal distribution of fluid through branches of equal flow areas although deviating in different degrees from the undivided line of flow.

An additional object is to provide a branch fitting having an internal reinforcement suitably formed and arranged to afford a predetermined distribution of fluid flow.

A further object of the invention incident to providing such internal reinforcement is to form the fitting from a minimum number of component parts, with a minimum expenditure of labor and materials; a related object pertaining to the manufacture of the fitting from standard commercially available tubing.

The foregoing and other objects and features of the invention will be more fully understood from the description to follow, particularly when read in conjunction with the accompanying drawings, in which:

Fig. 1 is a longitudinal sectional view of a form of branch fitting embodying principles of the present invention;

Figs. 2 to 5 inclusive are transverse sectional views taken along lines 2—2, 3—3, 4—4 and 5—5 respectively of Fig. 1;

Figs. 6 to 12 inclusive are views illustrative of steps in the method of fabricating a branch fitting such as is shown in Figs. 1-5; Figs. 6 and 7 being side and plan views respectively of one component at a preliminary stage of fabrication; Fig. 8 being a plan view of the same component at a subsequent stage; Figs. 9 and 10 being side and plan views respectively of apparatus suitable for shaping one of the components; Fig. 11 being a side view showing the relative positioning of components at a further stage; while Fig. 12 is a projection view taken along line 12—12 of Fig. 11 detailing the form of a second component included in Fig. 11; and, Fig. 13 is a fragmentary elevational view illustrating an embodiment of the invention in furnace wall construction.

The structure shown in Fig. 1 includes conduits 18 and 20 arranged in intersecting relation and suitably joined, as by weld metal 22, to form a branch fitting having terminal portions 24, 26 and 28 providing openings 30, 32 and 34 at their ends for communication with other conduits to which the conduits 18 and 20 would normally be connected. The ends of all terminal portions 24, 26 and 28 may be shaped as shown at 36 and 38, for example, to provide suitable welding groove surfaces for use in making connections with adjoining conduit lengths or sections. Such a fitting is susceptible of wide application, being adapted for use in heated or unheated locations, in the former instance a desirable application being in connection with heat exchange apparatus including for example furnace wall constructions of various arrangements; a specific application being illustrated in Fig. 13 to be discussed in more detail hereinafter.

It will be assumed for purposes of description that the terminal portion 24 is an inlet portion and that the stream of fluid admitted through inlet opening 30 is divided into a plurality of streams for separate discharge through the branch outlet openings 32 and 34 in terminal portions 26 and 28. In the construction shown, all terminal portions are of circular cross section and of equal flow areas, the terminal portion or branch 26 being in axial alignment with the inlet portion 24 and constituting an integral continuation thereof, the central axis of the terminal portion or branch 28 being oblique to the central axis of the inlet portion 24, the central axes of branches 26 and 28 intersecting as at point X, and the angle of divergence A between branches 26 and 28 being substantially 45° as indicated.

A stay plate or diaphragm 40 is arranged internally of the fitting to provide reinforcement at the junction of the conduits 18 and 20 where there is a departure from the original circular cross section of the component conduits 18 and 20 to the somewhat elongated overall cross section as illustrated in the transverse sectional views Figs. 3 and 4 in particular. The diaphragm extends inwardly from the crotch 42 of the fitting in the direction of the inlet opening 30, at an angle B of approximately 30° to the central axis of the main conduit 18, thus making an angle C of approximately 15° with the central axis of the branch conduit 20, the diaphragm terminating within the angle A in a free end or leading edge 44 positioned closely adjacent the central axis of the main conduit 18, although spaced therefrom, and in addition being more widely spaced from both the intersection X and from the central axis of the branch conduit 20.

The opposite wall surfaces 46 and 48 of the diaphragm are substantially flat and parallel to provide a diaphragm of substantially uniform thickness throughout its major portion and of a thickness substantially equal to the wall thickness of a component conduit 18 or 20. The edge 44 of the diaphragm is preferably rounded to a relatively small radius as indicated, and the adjacent surface portion 50 made parallel to the central axis of the main conduit 18, the succeeding downstream surface portion 52 being rounded to a relatively large radius to provide a gradual transition in contour between the planar surface portions 50 and 46.

In accordance with the present invention, the diaphragm 40 may desirably be formed as an integral continuation of the wall metal of one or the other of the component conduit portions, and other operations performed to complete the structure, in a manner now to be described with particular reference to Figs. 6-12 of the drawings. As shown in Figs. 6 and 7, the conduit 18 is cut transversely to provide a slot 54 extending approximately to the plane of the central axis and at a relatively steep inclination with respect thereto. A triangularly shaped opening 56 is cut through the wall of the conduit to provide an opening having its base coincident with the slot 54 and inclined sides 58 converging to an acute apex angle 60 in the direction of the terminal portion 26. The base of the opening 56 is spaced at its ends from opposite extremities of the slot 54 so that triangular corner projections or lips 62 of conduit metal are provided which may subsequently be forced inwardly to the position indicated in Fig. 8 to form the major portion of the diaphragm 40. The inclined sides 58 which also constitute the longitudinal edges of lips 62 are preferably beveled as at 64 so that when the lips are forced inwardly to an extent causing the edges 58 to be brought into close proximity to each other, the beveled portions 64 provide a suitably shaped welding groove 66 for the reception of weld metal 68, as in Figs. 3 and 4.

Figs. 9 and 10 illustrate a form of apparatus comprising a cylindrical mandrel 70 over which the preliminarily formed tubular article of Figs. 6 and 7 may be assembled for forming into the shape shown in Fig. 8. A base plate 72 is desirably provided to which the mandrel 70 may be rigidly secured at one end by means of an upstanding bar or plate 74 having welded connections as indicated with both the mandrel and the base plate, the mandrel 70 extending parallel to the upper surface 76 of the base plate 72 and being uniformly spaced therefrom a distance 78 to enable the conduit 18 to bear against the support surface 76 when mounted on the mandrel 70 in the position indicated by the broken outline. The free end of the mandrel 70 is formed with a plane surface 80 inclined to its central axis to substantially the same degree as the downstream surface 46 of the diaphragm 40, thus providing a forming surface against which the lips 62 may be flattened to bring them into alignment.

The conduit 18, prepared as in Figs. 6 and 7, is assembled over the mandrel 70 with one end against the bar 74 which acts as a stop, and with its opposite end suitably clamped or otherwise held in fixed relation to the base plate 72, the conduit being preferably heated to a predetermined forging temperature, at least in the region of the lips 62, before or after clamping, as desired. The lips 62 are then forced inwardly and flattened against the mandrel surface 80 by the application of continuous pressure or by a succession of blows, in which position the edges 58 are closely spaced and in substantially parallel relation to form the longitudinally extending welding groove 66. The contiguous edges 58 are then integrally united as by weld metal 68 fused with the metal of the lips 62, the beveled portions 64 of the edges 58 providing a welding groove 66 of outwardly flaring cross-section, or at least insuring a width of groove adjacent the outer surface 48 of the diaphragm at least as great as the width adjacent the inner surface 46 to facilitate welding throughout the entire thickness of the diaphragm metal.

At this stage of fabrication, it might be found desirable to further shape the diaphragm 40 to provide the desired contour of surfaces 44, 50 and 52 at and adjacent its free edge, and to even out any irregularities in its opposite faces 46 and 48 resulting for example from the bending or welding operation.

The bending of the lips 62 from the contour of the conduit to the plane of the diaphragm provides a V-shaped notch 82 approximately defined by intersecting transverse planes 84 and 86 as indicated in Fig. 11, the former coinciding with one wall of the original slot 54 and the latter coinciding with the plane of the diaphragm surface 48. The branch conduit 20 is shaped along corresponding planes so that it may be assembled into the notch 82 in conduit 18 substantially as shown in Fig. 11, the conduit 20 as viewed from the side next to the conduit 18 having an edge surface 88 substantially in the plane 86 and conforming approximately to the perimeter of the diaphragm surface 48. Those portions of the conduit 18 immediately adjacent the notch 82 may be beveled or otherwise shaped, as between the lines 90 and 92 (Fig. 8), to provide a suitable cross-section of welding groove completely outlining the notch 82 for the reception of the weld metal 22, the ultimate disposition of which is indicated approximately by the space within the broken marginal line 94.

The assembly of the conduits 18 and 20 is completed by a continuous line of weld metal 22 following the outline of notch 82 and fusing with the adjoining metal of the component conduits 18 and 20, the weld metal being applied and fused in accordance with any of several well-known welding processes.

It will be noted that in this construction the formation of the diaphragm 40 as an integral continuation of conduit metal results in a reduction in the number of separate parts required, and in the amount of welding, thereby facilitating manufacture and contributing to a considerable saving in labor and material. Furthermore, the line of weld metal 68 to complete the diaphragm 40 is separate from the line of weld metal 22 joining the conduits so that there is no interference between welds, and no impairment of one welded joint by the welding of another, as might be the case in other constructions where welds are superposed or otherwise contiguous to an appreciable extent. These are important considerations particularly where the fitting is intended for high pressure service in that the distribution of stresses in the vicinity of each of the welded joints is substantially uniform.

In a fitting as herein disclosed, the flow conditions are especially desirable, since it is possible for example to obtain substantial equality of fluid distribution in the conduit portions 26 and 28 when used as outlets, this being accomplished with all component conduit portions of the same internal cross section and flow area. Such equality of distribution has moreover been accompanied by a minimum pressure drop from one side of the junction to the other, in fact, actual tests have indicated the loss in velocity head to be substantially zero.

Fig. 13, illustrating an application of the invention to furnace wall construction, includes branch fittings 96 of the form already described having their branches 26 and 28 connected to vertically disposed and parallel lengths of closely spaced furnace wall tubes 98 which constitute heat exchange elements in a fluid circulation system. The lower inlet portions 24 of the fittings are connected to relatively short lengths of tubes 100 having connections with an inlet circulating header or drum 102 at longitudinal spacings twice the center-to-center spacings of the wall cooling tubes 98. The spaces thus provided at the header 102 between the header connecting tubes 100 enable other tubes 104, for example, to be installed for use as heat exchange elements in another part of the furnace, such elements having lower portions in a plane with the furnace wall tubes 98, whereas the upper major portions of their lengths are displaced from the plane of the tubes 98, at positions below the fittings 96, as indicated by the termination of each tube 104 in an elliptical section 106 as viewed in Fig. 13. In actual construction, suitable known means may be employed, if desired, for closing the spaces between adjacent tubes 98 and other fluid carrying elements in the same plane. In the arrangement disclosed, since one of each pair of wall tubes 98 is offset from the line of fluid flow from header 102 into a fitting 96, it would normally be expected that, with outlet flow areas and flow resistances equal, each offset tube 98 would be supplied with a smaller quantity of fluid than each tube 98 in alignment with the entering fluid flow. However, such a tendency is effectively overcome by the particular internal diaphragmed formation of the fittings 96, resulting in a substantially even balance of fluid flow throughout all connected tubes 98, and thereby an increased heat transfer capacity of the entire fluid circulation system.

While in the disclosure of this invention in accordance with the provisions of the statutes, certain specific size and angular relations have necessarily been indicated with respect to the conduits and diaphragm, it is to be understood that any or all of such relations may be suitably varied to provide other specific embodiments, without departure from the spirit of the invention covered by my appended claims, that the invention may be applied to curved conduit portions as well as to straight, and that certain features of my invention may sometimes be used to advantage without a corresponding use of other features.

I claim:

1. A branch fitting comprising a first tube having an opening in a side wall thereof and a second tube connected at its end in angular relation to said first tube at the perimeter of said opening, said opening forming an angular notch having legs in planes oblique to the longitudinal axis of said first tube, said first tube having portions of its wall bent into the plane of one of said legs at an inclination to said axis less than the angle between said tubes.

2. A branch fitting comprising preformed tubular parts of circular cross section, one of said parts having an angular notch formed in the side thereof intermediate its ends and having a wall of metal unitary with the metal of said part extending across one leg of said notch, said notch and said wall extending substantially to the central axis of said part, the other of said parts having an end portion and an adjoining side portion in substantially the same angular relation as the legs of said notch and positioned in contiguous relation to said legs, and weld metal joining said parts throughout the perimeter of said notch.

3. A branch fitting comprising preformed tubular parts of circular cross section, one of said parts providing an inlet and an outlet at opposite ends and having an angular notch formed in the side thereof intermediate said ends, said notch having unequal legs each in a plane oblique to the longitudinal axis of said part, the longer leg of said notch being positioned toward said outlet end and having the lesser inclination to said axis, a wall of metal unitary with the metal of said part extending across said longer leg, the other of said parts providing an outlet and opposite thereto having an end portion and an adjoining side portion in planes substantially parallel to the planes defining said notch, said end and side portions being arranged in contiguous relation to said legs, and weld metal joining said parts throughout the perimeter of said notch.

4. A branch fitting comprising preformed tubular parts of substantially equal circular cross section, one of said parts providing an inlet and an outlet at opposite ends and having an angular notch formed in the side thereof intermediate said ends, said notch extending substantially to the central axis of said part and having unequal legs each in a plane oblique to said axis, the longer leg of said notch being positioned toward said outlet end and having the lesser inclination to said axis, the other of said parts providing a branch outlet and opposite thereto having end and side portions arranged in contiguous relation to said legs, weld metal joining said parts throughout the perimeter of said notch, and a diaphragm equally dividing fluid flow into said outlets comprising a wall of metal unitary with the metal of one of said parts and disposed substantially in the plane of said longer leg.

5. A branch fitting comprising a first tube having an opening in a side wall thereof and a second tube connected at its end in angular relation to said first tube at the perimeter of said opening, said opening being formed as an angular notch having one leg in a plane oblique to the longitudinal axis of said first tube, said first tube having a portion of its wall bent into the plane of said one leg and constituting a diaphragm extending partially across the interior of said tube.

6. A branch fitting comprising a first tube having an opening in a side wall thereof and a second tube connected at its end in angular relation to said first tube at the perimeter of said opening, said opening being formed as an angular notch having unequal legs of which at least the longer leg is in a plane oblique to the longitudinal axis of said first tube, one of said tubes having a portion of its wall bent into the plane of said longer leg and constituting a diaphragm extending partially across the interior of each of said tubes.

7. A branch fitting comprising a first tube of curvilinear cross section having a notch in a side wall thereof providing an opening to the interior of said tube, and a second tube of curvilinear cross section having its interior in communication with said opening and having a connection with said first tube throughout the perimeter of said notch, one of said tubes having a substantially flat wall portion conforming to a portion of said notch and constituting a diaphragm extending partially across the interior of at least one of said tubes.

8. A branch fitting comprising preformed tubular metal parts, one of said parts having a notch formed in the side thereof intermediate its ends, said notch having an end portion closed to the interior of said part and having its remaining opposite end portion open to said interior, said part having a wall portion extending inwardly thereof and defining said closed end portion of said notch, the other of said parts having its interior in communication with said open end portion of said notch and having wall portions arranged in contiguous relation to the notch perimeter, and weld metal joining said parts throughout said perimeter.

IVAR L. LANGVAND.

REFERENCES CITED

The following references are of record in the file of this patent:

UNITED STATES PATENTS

| Number | Name | Date |
|---|---|---|
| 427,478 | McEvoy | May 6, 1890 |
| 1,505,208 | Larner | Aug. 19, 1924 |
| 1,629,208 | Ernst | May 17, 1927 |
| 1,810,178 | Jacobus | June 16, 1931 |
| 1,924,900 | Armacost | Aug. 29, 1933 |
| 1,984,242 | Trainer | Dec. 11, 1934 |
| 2,065,789 | Bolsinger | Dec. 29, 1936 |
| 2,105,267 | Robertson | Jan. 11, 1938 |
| 2,297,013 | Nichols | Sept. 29, 1942 |

FOREIGN PATENTS

| Number | Country | Date |
|---|---|---|
| 363,771 | Germany | Mar. 8, 1921 |
| 484,225 | Germany | Sept. 26, 1929 |